United States Patent [19]

Stumpp et al.

[11] 4,357,920

[45] Nov. 9, 1982

[54] APPARATUS FOR THE ADJUSTMENT OF A QUANTITY-METERING MEMBER OF A FUEL INJECTION PUMP

[75] Inventors: Gerhard Stumpp, Stuttgart; Wolf Wessel, Oberriexingen; Ulrich Flaig, Markgröningen; Fridolin Piwonka, Gerlingen; Ludwig Walz, Stuttgart, all of Fed. Rep. of Germany

[73] Assignee: Robert Bosch GmbH, Stuttgart, Fed. Rep. of Germany

[21] Appl. No.: 230,180

[22] Filed: Jan. 30, 1981

Related U.S. Application Data

[63] Continuation of Ser. No. 29,427, May 10, 1979, abandoned.

[30] Foreign Application Priority Data

May 12, 1978 [DE] Fed. Rep. of Germany ....... 2820807

[51] Int. Cl.³ .................... F02M 59/20; F02P 5/08; F02M 51/06
[52] U.S. Cl. .................... 123/446; 123/340; 123/358
[58] Field of Search ............... 123/446, 340, 358, 361, 123/378

[56] References Cited

U.S. PATENT DOCUMENTS 3,888,220  6/1975  Bigalke et al. .................. 123/340
4,174,694  11/1979  Wessel et al. .................. 123/340
4,223,654  9/1980  Wessel et al. .................. 123/340

Primary Examiner—Raymond A. Nelli
Attorney, Agent, or Firm—Edwin E. Greigg

[57] ABSTRACT

A device is proposed for the adjustment of a quantity-metering member of a fuel injection pump in an internal combustion engine with self-ignition, comprising an electric circuit arrangement for a control signal dependent on operating parameters, this signal inffluencing the position of the quantity-metering member via an electromagnetic servo unit wherein the electric circuit arrangement includes at least one series circuit made up of a minimum value selection stage, a maximum value selection stage, and a servo unit controller for the quantity-metering member and the output signals of at least two set-point stages for, in particular, the speed, the smoke limit, equalization, and exhaust gas temperature can be fed to the minimum value selection stage with the maximum value selection stage additionally coupled to a start control stage. In addition to the use of the device as a total controller, i.e., the electric circuit arrangement alone determines the position of the quantity-metering member and no mechanical controller is additionally provided, the device can also be utilized where only a regulated stop for the quantity-metering member, for example a control rod, is present as the control member ("signal mixing"). The purpose of the proposed device is to furnish an electronic speed regulation for idling and for intermediate speeds, beyond the quantity-limiting functions of equalization (limitation of the injection only in dependence on the speed), smoke limit, and exhaust gas temperature limit, in case of a total controller as well as in case of signal mixing with the aid of a controlled servo unit, so that the speed is maintained constant at the preset and/or desired value even in an unstable condition during varying loads, for example, due to the additional connection of auxiliary units.

13 Claims, 21 Drawing Figures

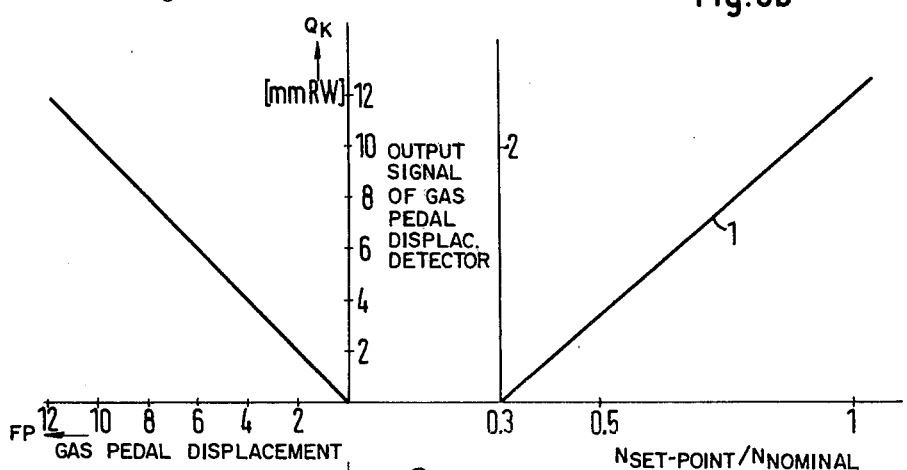
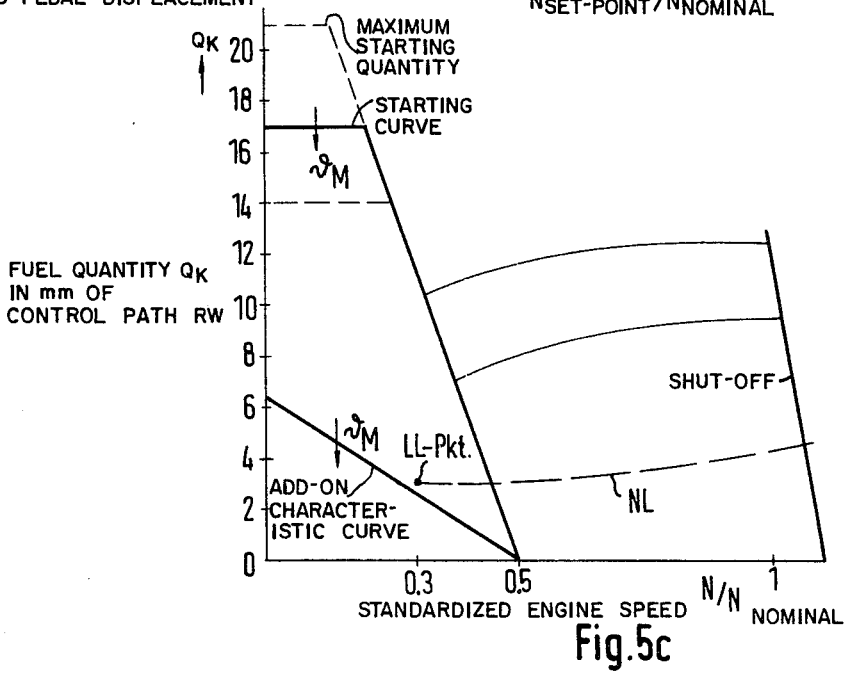

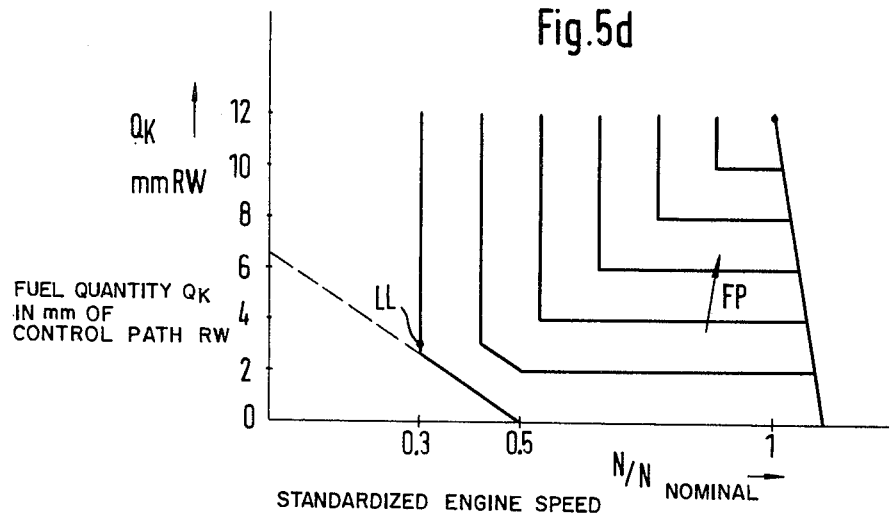
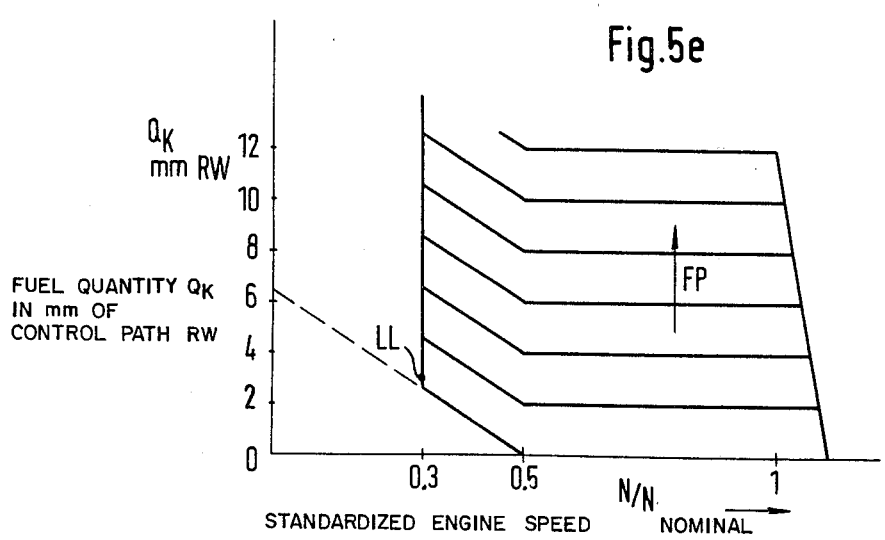

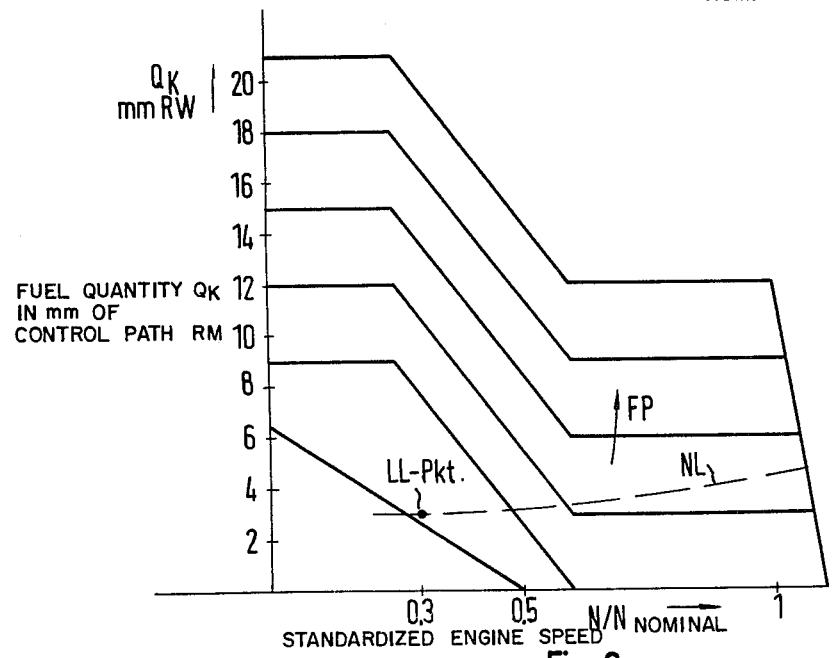

1

APPARATUS FOR THE ADJUSTMENT OF A QUANTITY-METERING MEMBER OF A FUEL INJECTION PUMP

This is a continuation of application Ser. No. 29,427 filed May 10, 1979 now abandoned.

BACKGROUND OF THE INVENTION

The invention relates to apparatus for the adjustment of the quantity-metering member of a fuel injection pump in an internal combustion engine.

U.S. Pat. No. 4,223,654, issued Sept. 23, 1980 to Wessel et al, describes a control apparatus for positioning the control rod of an injection pump with a combination of an electrical and mechanical controller. The electrical controller here has the function of regulating a stop in accordance with the speed of the internal combustion engine. One disadvantage in the conventional arrangement is the fact that there is only the limited possibility of affecting the control and/or regulation of the quantity-metering member.

OBJECT AND SUMMARY OF THE INVENTION

It is an object of the invention to provide apparatus for adjusting a quantity-metering member of a fuel injection pump, which apparatus processes a maximum number of operating parameters and wherein an electronic speed control may be used. The apparatus is therefore able to serve as an electronic total control of an internal combustion engine, as well as for an electronic signal combined with a conventional mechanical controller.

The apparatus of this invention has the advantage, as compared to the prior art, of comprehensively covering all possible operating parameters to thereby offer an optimum adjusting possibility of the quantity-metering member. This has an advantgeous effect especially in the lower speed range, for example, in the elctronic control of the idling speed, and particularly when additional loads are connected to and disconnected from the internal combustion engine. It is furthermore advantageous in that the driving behavior of a vehicle can be adjusted, by means of the engine controlled in accordance with this invention in a simple way and by changing an upward slope in a characteristic curve.

By means of the various embodiments of the invention, advantageous further developments and improvements for adjusting a quantity-metering member of a fuel injection pump are possible. It is especially advantageous if the electric circuit arrangement for controlling the device comprises a so-called add-on characteristic, by means of which especially in case of a rapid drop in speed (with a small external braking moment and a small total moment of inertia, with the transmission being disengaged) a rapid drop to below the desired idling speed is prevented. A further advantage is obtained in that the add-on characteristic reduces, in the low speed range, especially when starting from idling, delay paths (dead motion) at the gas pedal to a minimum.

Other objects and advantages of the present invention will be more readily apparent from a further consideration of the following detailed description of the preferred embodiments taken in conjunction with the drawings, in which:

BRIEF DESCRIPTION OF THE DRAWINGS

FIGS. 5a–5e are five diagrams illustrating the mode of operation of the speed controller and the definition of the operating ranges of the electric and mechanical controllers for an electronic total controller;

FIGS. 6a–6e are five diagrams similar to FIGS. 5a–5e for a correction signal mixing system;

DESCRIPTION OF THE PREFERRED EMBODIMENTS

Figure 1:
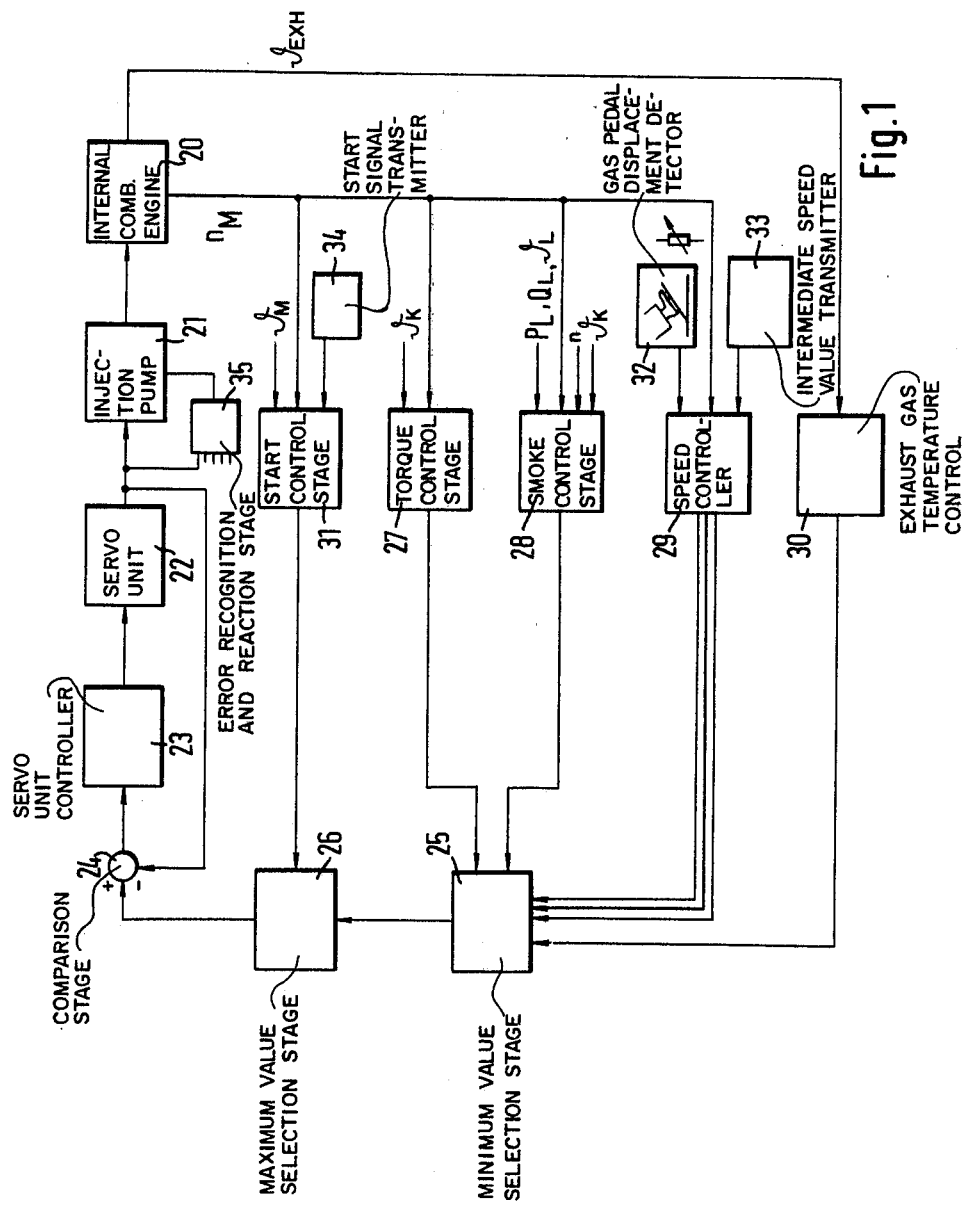
FIG. 1 shows a schematic block circuit diagram of the apparatus in accordance with the invention for adjusting a quantity-metering member of a fuel injection pump.

The apparatus of this invention serves for the adjustment of a quantity-metering member of a fuel injection pump in an internal combustion engine with self-ignition. FIG. 1 shows an overall block diagram for the mechanical portion as well as the electric circuit arrangement of the device. FIG. 1 includes an internal combustion engine 20, an injection pump 21 connected in front of the internal combustion engine 20, the quantity-metering member of which is adjustable by a servo unit 22 with respect to its position. This servo unit 22 is arranged as an electromechanical servo unit and receives control signals from the servo unit controller 23. A difference signal with respect to the desired position and the actual position of the servo unit 22 is fed to the controller 23 as an input variable.

The comparison stage 24 connected in front of the servo unit controller 23 receives the actual value signal from an electric circuit arrangement processing the operating parameters. This circuit arrangement includes a minimum value selection stage 25 and a maximum value selection stage 26. The minimum value selection stage 25 receives the output signals from a torque control stage 27, a smoke characteristic 28, a speed controller 29, as well as an exhaust gas temperature controller 30, wherein the speed controller 29 of the minimum value selection stage 25 can also transmit several signals, depending on the degree of sophistication.

The maximum value selection stage 26 obtains its input signals from the minimum value selection stage 25, as well as from a start control stage 31. The type of operating parameters processed in the apparatus of FIG. 1 is only generally indicated. Thus, the torque control stage 27 receives a fuel temperature signal $\theta_K$ as well as a speed signal n from a speed transmitter coupled to the internal combustion engine 20. The smoke characteristic 28 serves to limit the fuel quantity injected, especially in the low speed range, and is fed, as input variables, signals with respect to the speed, the fuel temperature, and the taken-in quantity of air. The quantity of air value is determined by the measurement of pressure $P_L$ and temperature $\theta_L$ in the intake manifold or by a direct measurement of the air quantity $Q_L$.

The speed controller 29 is coupled with a gas pedal displacement detector 32 and additionally receives a speed signal $n_M$ from the engine as well as a signal from a desired intermediate speed value transmitter 33 so that the driving speed can be limited (controlled), for example, in accordance with the gear into which the transmission has been shifted. The exhaust gas temperature controller 30 receives an input signal $\theta_{Exh}$ from an exhaust gas temperature detector (not shown) in the zone of the internal combustion engine 20. Finally, the start control stage 31 receives a signal from a start signal transmitter 34, a signal involving the internal combustion engine temperature $\theta_M$, as well as a speed signal $n_M$ from the speed transmitter coupled with the internal combustion engine 20.

The minimum value selection stage 25 serves to select, for each operating condition of the internal combustion engine 20, among the respective output variables from units 27–30, that value representing the desired servo unit value which corresponds to the smallest maximally permissible amount of fuel in order to protect the internal combustion engine 20 from mechanical and thermal overload and to keep the exhaust gas contamination within limits. To be able to signal, during startup of the internal combustion engine 20, a definite and temperature-dependent fuel quantity to the servo unit controller 23, the maximum value selection stage 26 is connected after the minimum value selection stage 25 through stage 26, the signal of an increased amount of fuel during startup from the start control stage 31 can be taken into account. However, care must be taken that the output signal of the start control stage 31 is maintained, except for the case of starting, at a low level so that the limiting characteristic of the minimum value selection stage 25 becomes effective with regard to the quantity-metering member of the injection pump 21.

The above-referenced U.S. Pat. No. 4,223,654 describes a similar circuit arrangement, in which signals corresponding to the maximum premissible fuel quantity for preventing excessive torque, exhaust gas temperature or exhaust gas contamination are supplied to a minimum value selection circuit, whose output signal, together with the output signal of a start control stage, is supplied to a maximum value selection circuit. The minimum and maximum value selection stages 25, 26, the torque control stage 27, the smoke characteristic 28, and the exhaust gas temperature controller 30 may be similar or identical to the corresponding circuits described in U.S. Pat. No. 4,223,654.

The arrangement illustrated in FIG. 1 can be used, in principle, as a total controller as well as a correction controller. When used as a total controller, the injection pump 21 does not contain an additional mechanical control means. The servo unit 22, in this case, is fixedly connected with the quantity-metering member of the injection pump, e.g., the control rod. In contrast thereto, the injection pump 21 has a mechanical control means when using the mode of operation of a correction controller or abutment controller for the device shown in FIG. 1. The servo unit 22 only moves an abutment which limits the displacement of the quantity-metering member of the injection pump, which member can be mechanically adjusted by the gas pedal. Furthermore, the speed controller 29 as well as the smoke characteristic 28 are arranged so as to adapt to the mode of operation of the mechanical control means in the injection pump 21. Finally, an error recognition and reaction stage 35 is provided which interrogates various signals essential to the operating behavior of the internal combustion engine 20 so that it can act, in case of an error, on the injection pump 21 in such a way that no danger will arise for persons and for parts of the vehicle, but still an emergency driving mode can optionally be maintained.

Figure 2:
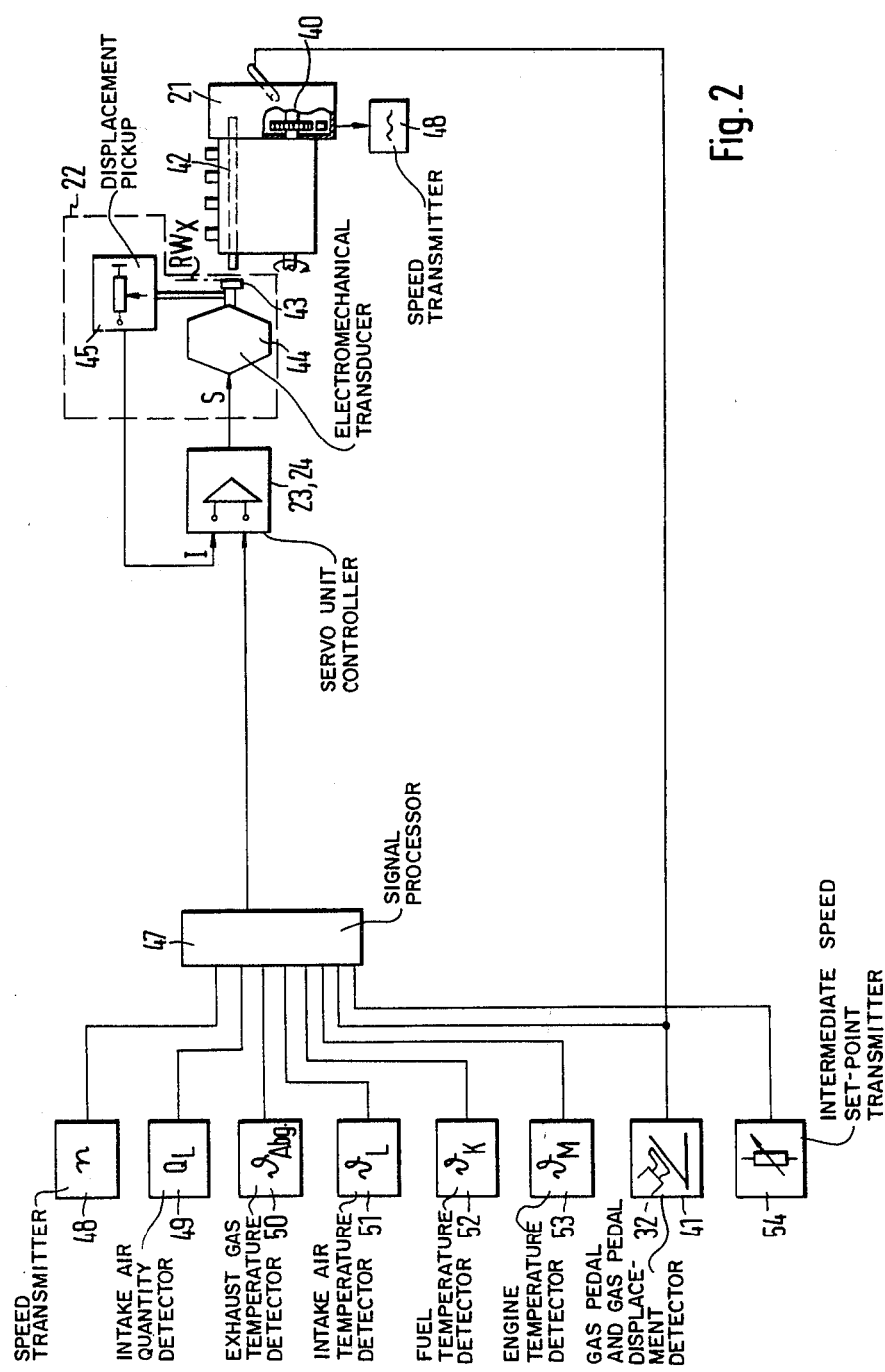
FIG. 2 shows a general block circuit diagram of a apparatus operating as an abutment controller.

FIG. 2 is an illustration of an abutment control for the control rod as the quantity-metering member of an injection pump 21 which corresponds to the illustration of FIG. 1. Since no total control is desired by means of the electronic section, the injection pump 21 also comprises a mechanical controller 40 which, however, is not shown in detail.

The gas pedal 41, coupled additionally with the gas pedal displacement detector 32, is connected to this mechanical controller 40. The control rod 42 in the injection pump 21 is connected with the mechanical controller 40 and additionally with an abutment 43, if the rod is in contact therewith, the position of this abutment 43 being determined by the servo unit 22. The servo unit 22 comprises an electromechanical transducer 44 as well as a displacement pickup 45 to signal the abutment position to the servo unit controller 23.

The arrangement of FIG. 2 also includes a signal processor 47. This system forms, from all operating parameters to be considered, the set-point signal for the servo unit controller 23. Operating parameters which are processed in the signal processor 47 to provide the set-point for the servo unit controller 23 are, in particular, the variables: speed, air quantity, exhaust gas temperature, air temperature, fuel temperature, and engine temperature, the position of the gas pedal, as well as a speed which can be set and selected, for example, by hand. These above-mentioned variables can be derived from pickup means 48–54, respectively.

In the correction controller illustrated generally in FIG. 2, the abutment control is to become effective only in a specific speed range and optionally load range, whereas in the residual ranges, the mechanical controller 40 takes over the desired controller function. In the arrangement of FIG. 2, the error recognition and reaction stage 35, illustrated in FIG. 1 in conjunction with the injection pump 21 and/or its control rod 42, is not shown.

Figure 3:
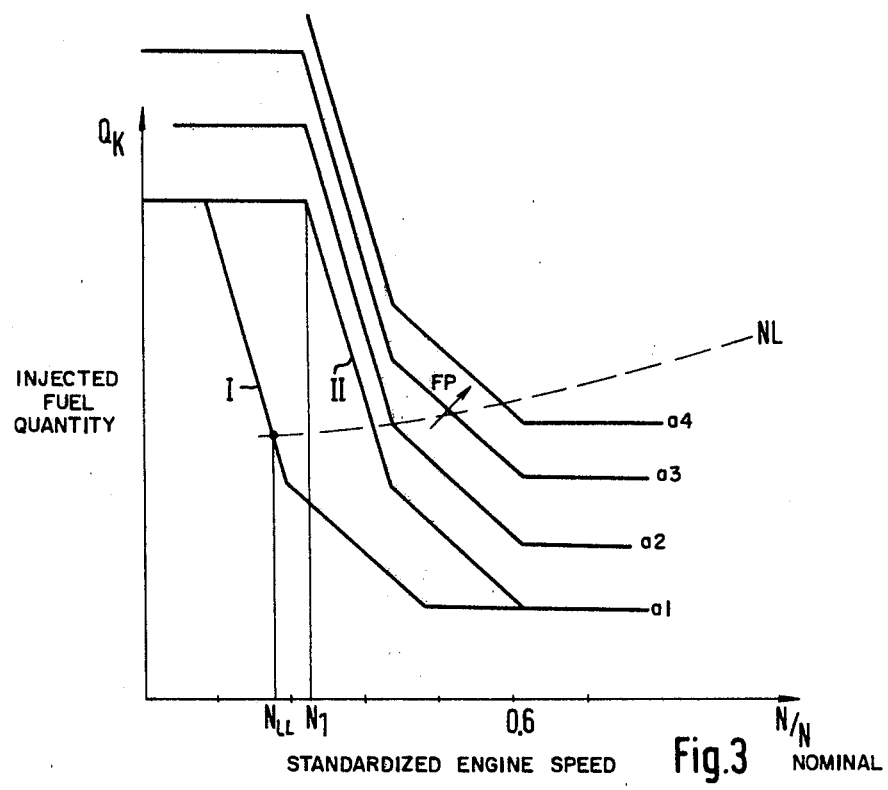
FIG. 3 shows an array of characteristic curves of injected fuel quantity versus engine speed for various gas pedal positions, for demonstrating the operation of the apparatus of the invention in the lower speed range.

In case of abutment controls precisely for low speed ranges, preferably in case of the electronic control of the idling speed, the mode of operation of the mechanical controller 40 and of the electronic abutment control means are correlated with each other in such a way that the electrically controlled abutment overrides the mechanical controller 40 and thus the effect of the electric controller dominates. To attain this, an appropriate design of the mechanical controller 40 is required. FIG. 3 is an illustration of this feature.

FIG. 3 shows the amount of fuel injected $Q_K$, plotted over the standardized speed N (actual engine speed/nominal engine speed), with the gas pedal position FP as the parameter wherein the curves a1-a4 correspond to respective positions of the gas pedal. The zero load line NL is indicated in dashed lines. Symbol I denotes a normal idling $N_{LL}$ characteristic of a purely mechanical controller, II denotes a higher-set mechanical idling $N_1$ characteristic so that the electric controller can become fully effective in the original idling point, thus attaining an exact idling speed control with a so-called "P-degree" equalling zero.

FIG. 3 shows that the point of intersection of the zero load line with the (higher-set) purely mechanical characteristic curve is higher with respect to the fuel quantity as well as the speed than the point of intersection of the zero load line NL with the original idling characteristic curve on which is located the idling point now adjusted electronically. This points to an overriding of the mechanical controller 40 by the electronically controlled abutment, whereby the mechanical controller 40 can no longer exert an actual control function in this range.

Figure 4:
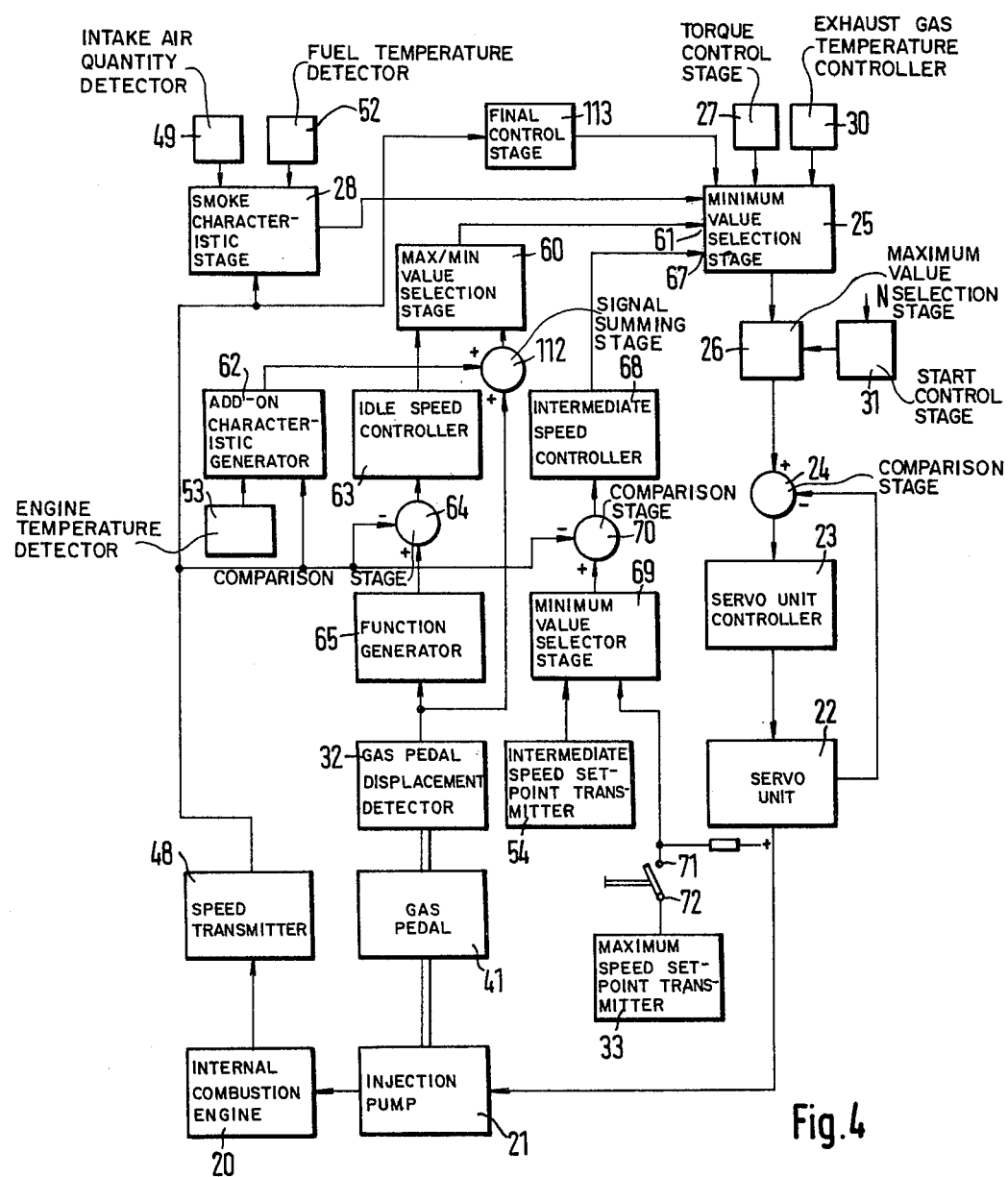
FIG. 4 is a block circuit diagram of the electric circuit arrangement incorporated in the apparatus of the invention.

FIG. 4 shows a block circuit diagram in greater detail than that of FIG. 1, especially with regard to the speed controller 29 of FIG. 1. Identical components are denoted by the same numerals employed in the block circuit diagram of FIG. 1. The important aspect in the arrangement of FIG. 4 is a maximum value selection stage 60 in front of an input 61 of the minimum value selection stage 25. Input variables for this maximum value selection stage 60 are transmitted by an (idling) speed controller 63 and a summing unit 112. In the summing unit 112, the output signals of a gas pedal displacement detector 32 and of an add-on characteristic generator 62 are added up. The add-on characteristic generator 62 is connected with the speed transmitter 48 as well as with a temperature detector 53 for the internal combustion engine temperature. The input of the speed controller 63 receives a signal from a comparison stage 64 for a speed signal from the speed transmitter 48 as well as from the output signal of a function generator 65 to form the desired speed characteristic. This function generator 65, in turn, is connected with the gas pedal displacement detector 32.

Finally, the minimum value selection stage 25 has a further input 67 for the output signal of an intermediate speed controller 68. The purpose of the intermediate speed controller 68 is to maintain a selectable speed even during load fluctuations, for example, while the vehicle is in operation while at a standstill and when ancillary units are being operated. For this purpose, an intermediate speed set-point transmitter 54 (see also FIG. 2) is coupled via a minimum value selection stage 69 and a comparison point 70 with the input of the intermediate speed controller 68. A negative input of the comparison point 70 is connected to the speed transmitter 48. A second input of the minimum value selection stage 69 is connected to a gear contact 71 for the highest gear, the second terminal 72 of which is connected to a maximum speed set-point transmitter 33.

During normal driving operation, the intermediate speed controller 68 must not become activated. This is accomplished by setting the input potential at the input 67 of the minimum value selection stage 25 at a high value, which is done by raising the input potentials of the minimum value selection stage 69.

If the system illustrated in FIG. 4 is used in the framework of an electronic total control, then the output signal of a final control stage 113 is additionally fed to the minimum value selection stage 25 and this final control stage 113 takes care of regulating the speed for $N > N_{nominal}$.

The maximum value selection stage 60 is essential for three operating conditions:

(a) Through the add-on characteristic generator 62, a quiet and safe operation of the internal combustion engine 20 is ensured when changing over from coasting to the idling speed range.

(b) The speed controller 63 is effective preferably in the lower speed range in accordance with the output signal of the function generator 65; and (c) The connection of the maximum value selection stage 60 to the gas pedal displacement detector 32 via the summing unit 112 serves to avoid delay (dead) displacements at the gas pedal and thus serves for a favorable driving characteristic, especially when the vehicle equipped with the internal combustion engine 20 is accelerated from coasting.

FIGS. 5a–5e show the essential characteristic curves when using the system as a total controller; FIGS. 6a–6e show the curves obtained with using the system as a correcting signal-mixing circuit. Fuel quantity $Q_K$ and gas pedal FP displacement are shown in millimeters of control path RW.

FIG. 5a shows plotted on the ordinate, the output signal of the gas pedal displacement detector 32 in accordance with the gas pedal displacement of gas pedal 41. The illustrated straight line characterizes the ideal relationship between the traversed displacement path of the gas pedal and the output signal of the gas pedal displacement detector 32.

FIG. 5b illustrates the input-output characteristic of the desired speed generator 65 with two examples. For each curve, it is assumed that for the gas pedal position zero, the output variable corresponds to the desired idling speed. Depending on the configuration of the curve, the control behavior and thus the driving behavior can be affected within wide limits.

Curve 1 effects an adjusting controller characteristic according to FIG. 5b, wherein for $N > N_{set-point}$ the filling is predetermined by the gas pedal. This also holds true for re-acceleration from coasting, which means that the engine assumes a desired momentum from coasting without any delay displacement of the gas pedal. Therefore, filling control is always present when the output signal of the speed controller 63 does not exceed the desired quantity predetermined by the gas pedal displacement detector 32.

However, if the desired speed curve has the configuration according to FIG. 5, curve 2, i.e., if the desired speed is always equal to the desired idling speed, independently of the gas pedal position, then there is present the characteristic of a final idling controller; apart from the add-on characteristic, there is a pure filling characteristic between idling speed LL and nominal speed (FIG. 5e).

FIG. 5c shows generally the configuration of the limit curve in the load-speed diagram.

FIG. 5d shows the steady load-speed array of curves of the electronic total controller as an adjustment controller.

FIG. 5e shows the steady load-speed array of curves of the electronic total controller as a final idling controller (without torque limit, smoke limit, exhaust gas temperature restriction, and start control).

Figure 6D:
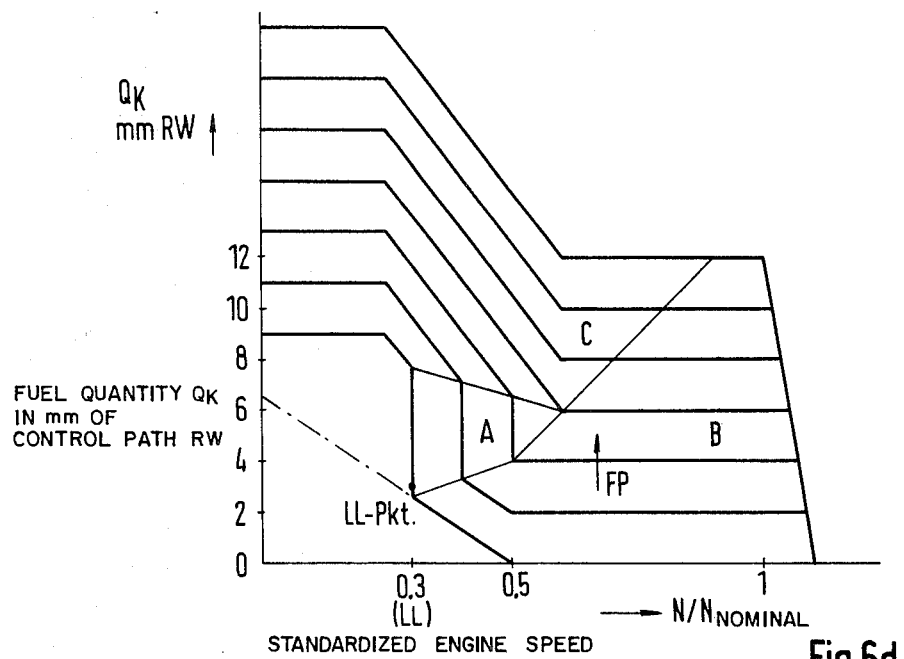

FIGS. 6a–6e show examples of curves for the system in the form of a correction signal-mixing unit. FIG. 6a shows the linear correlation between the displacement of the gas pedal and the output of the gas pedal displacement detector 32.

By an appropriate choice of the characteristic curve of the desired speed generator 65, driving behavior can even be influenced when using signal mixing. For explanatory purposes, FIG. 6b, curves 1 and 2 will be considered. It is assumed that during the signal-mixing process, a readily modified, mechanical final idling controller is provided with characteristic curves corresponding to FIG. 6c.

With a desired speed curve according to FIG. 6b, curve 1, the steady load-speed array of curves according to FIG. 6d is obtained. Three different areas can be observed:

(A) Electronic adjustment characteristic (speed control)
(B) Electronic filling characteristic (momentum control)
(C) Mechanical adjustment-filling characteristic corresponding to the characteristic curves of the mechanical controller As an example, let us consider a rapid rise in speed for gas pedal position 2. According to FIG. 6b (curve 1), a desired speed value of 0.4 results for this position of the gas pedal. This means that the characteristic of the mechanical controller is effective only up to the attainment of the speed 0.4, because thereafter the electronic speed control dominates in area (A). Upon a further drop in the load, transition to electronic filling control takes place via the maximum value selection stage 60 of FIG. 4, once the speed controller output signal drops below the desired filling value ($Q_{k\ set\text{-}point}$).

Figure 6E:
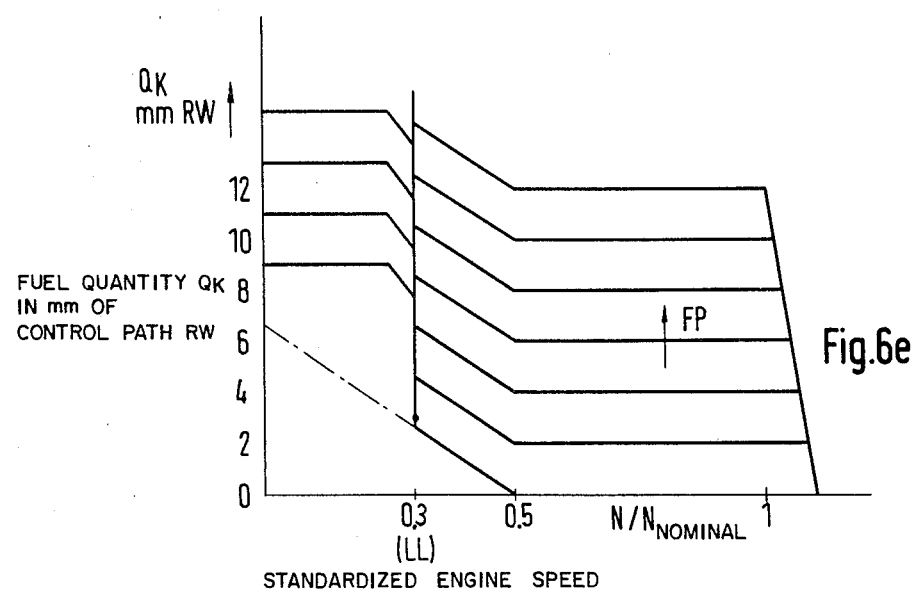

A desired speed characteristic according to FIG. 6b, line 2, (constant desired value = idling speed independently of the gas pedal position) results in the load-speed array of curves according to FIG. 6e. Here there is an adjusting characteristic only in case of idling speed, where all curves extend perpendicularly for a certain distance. For speeds below the idling speed, the characteristic of the (modified) mechanical controllers prevails in this area; for speeds higher than the idling speed, electronic filling control occurs. Thus, a final idling controller exists here, having an idling-P-degree of zero.

FIGS. 6d and 6e do not show the torque limit line, the smoke limit, and the exhaust gas temperature limit, which in each case limit the load in accordance with the operation.

Figure 7:
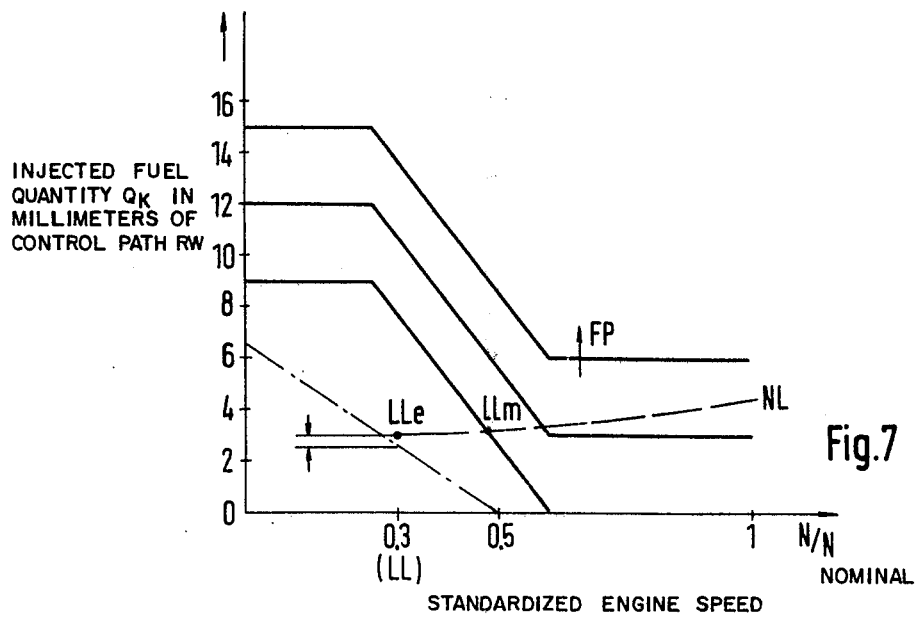
FIG. 7 shows an array of curves of injected fuel quantity versus engine speed for various gas pedal positions, illustrating the mode of operation of the add-on characteristic employed in the invention.

FIG. 7 illustrates the mode of operation and the purpose of the add-on characteristic generator 62 of FIG. 4. The characteristic curves in the diagram of FIG. 7 are plotted again in millimeters of control path over the standardized speed. The curves of the modified mechanical controller are in solid lines, the zero load line is in dashed lines, and the add-on characteristic line is shown in dot-dash lines. The add-on characteristic line extends upwardly in the zone of low speed values.

LLm denotes the idling point of the purely mechanical controller, LLe is the idling point of the electric abutment controller. The associated idling speed is, for example, 0.3. The add-on characteristic is dimensioned so that it lies closely below the electrically set idling point. The distance of the idling point to the add-on characteristic in the direction of the ordinate is suitably 10-20% of the idling quantity.

If the internal combustion engine 20 is operated in a coasting mode, then at high speeds the supplied quantity of fuel $Q_{K\ set\text{-}point}$ is reduced to zero. As a consequence, the speed is lowered. The add-on characteristic now forms a ramp for the reinitiated feed of fuel to the internal combustion engine 20, lying at the related speed value of 0.3 closely below the idling quantity. Without this add-on characteristic, the speed would drop, in the dynamic thrust with the value of supplied fuel equaling zero, temporarily too far below the desired idling speed, if the speed controller 63, with respect to interference behavior, is optimized in the linear range. The add-on characteristic is advantageous, in particular, if the internal combustion engine 20 is to be accelerated from idling. Without the add-on characteristic, there would result a troublesome idle stroke of the gas pedal in accordance with the magnitude set at that instant by the speed controller 63 for regulating and/or maintaining the idling speed.

Advantageously, the position of the add-on characteristic is chosen in accordance with the temperature of the internal combustion engine 20, namely along the lines that it is displaced, when the internal combustion engine 20 is cold, in parallel in a direction to a greater quantity.

The add-on characteristic need not necessarily be a straight line. Thus, ramps of any desired type can be utilized, as long as they pass through below the idling point LLe.

The speed controller 63 shown in FIG. 4 has a PID characteristic in the illustrated embodiment, because this characteristic has proven to be advantageous. Due to its differentiating behavior on account of the D-portion, this speed controller 63 can partially follow surges in its input signal, but delay paths at the gas pedal cannot be excluded thereby. For this reason, the maximum value selection stage 60 is provided with a direct connection to the gas pedal displacement detector 32, so that, for example, from coasting a rise in the output signal of the gas pedal displacement detector 32 (desired momentum) can have a direct effect on the maximum value selection stage 60.

If an intermediate speed control is desirable, then the output signal of the maximum value selection stage 60 must be brought to a high value, due to the minimum value selection stage 25. This is done by depressing the gas pedal 41 all the way and arresting it. Due to the high signal at the input 61 of the minimum value selection stage 25, with a corresponding position of the intermediate speed set-point generator 54, the input signal at the input 67 of the minimum value selection stage 25 is thus lower than the signal at the input 61, whereby an intermediate speed control becomes possible. As an example for the utilization of the intermediate speed control, reference is made to the use of the internal combustion engine 20 in a rescue vehicle with an emergency current generator, which vehicle operates at the deployment site as an emergency generator plant and, in this case, the speed of the generator must be maintained at a constant value.

The intermediate speed controller 68 can also serve as a driving speed limiter in the vehicle equipped with the internal combustion engine 20. In this case, a gear contact 72, in cooperation with a maximum speed set-point transmitter 33, takes care of limiting the driving speed in this highest gear. In this connection, the speed limiting mechanism can be deactivated simply by easing off on the gas pedal 41, because then the difference of the potentials at inputs 61 and 67 of the minimum value selection stage 25 is reduced and finally increases again in the opposite sense, so that the intermediate speed controller 68 becomes ineffective.

Figure 8A:
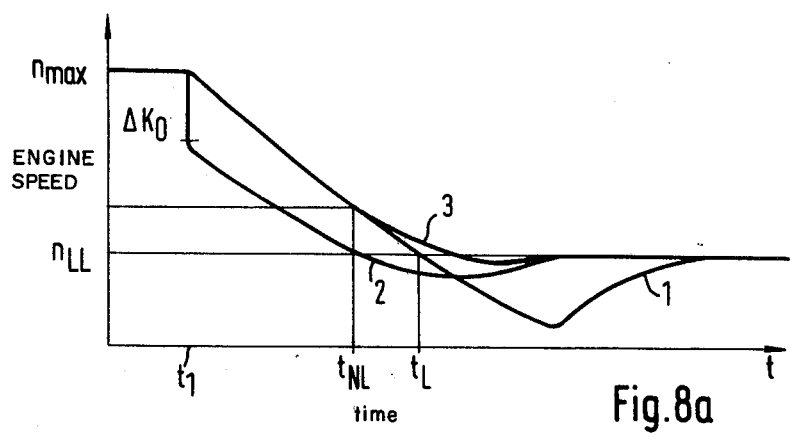
FIG. 8a is a speed-time diagram relating to a supplement to the speed controller of the invention.
Figure 8B:
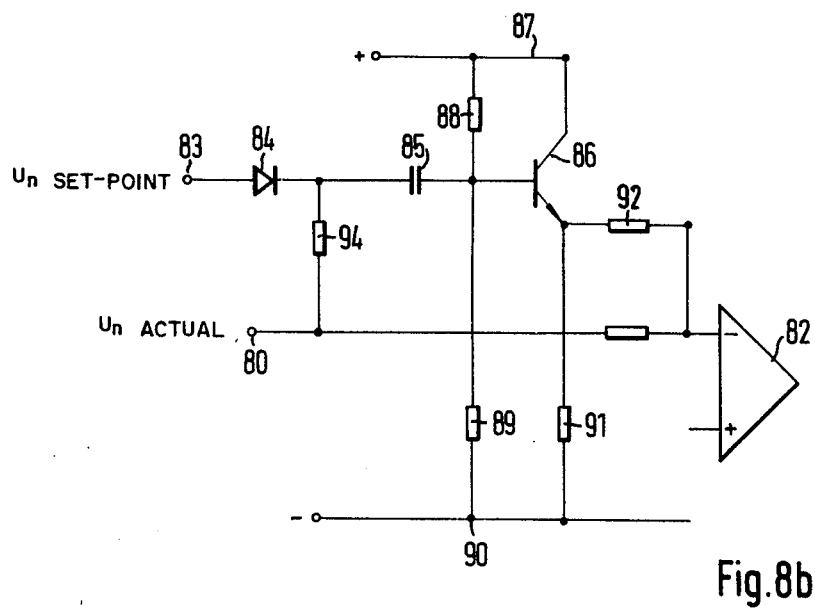
FIG. 8b is a circuit diagram relating to a supplement to the speed controller of the invention.

Instead of the add-on characteristic generator 62 in the circuit arrangement according to FIG. 4, it is also possible to employ a "nonlinear addition" to the speed controller 63. The mode of operation and structure of this device are shown in FIGS. 8a and 8b. In FIG. 8a, the speed is plotted over the time. At instant $t_1$ the gas pedal 41 is eased off, and the internal combustion engine 20 operates in dynamic coasting mode. Without the add-on characteristic of FIG. 6 and without the addition to the speed controller 63, the speed drops and falls, at instant $t_1$, below the desired idling speed. Only starting with this point in time, the speed controller 63 acts along the lines of a reaction against further reduction in speed and, finally, sets a value corresponding to the idling speed, as demonstrated by curve 1 in FIG. 8a. It can be seen that the actual speed drops considerably below the desired speed, which in extreme cases can lead to stalling of the engine.

By means of the "nonlinear addition to the speed controller" this large drop can be avoided. In case of jumps in the desired value from a high speed to a low speed, an additional, apparent speed signal dependent on the magnitude of the jump is superimposed dynamically on the actual speed signal, so that the controller 63 is temporarily misled to perceive a lower actual speed (see curve 2 in FIG. 8a). Thereby the idling speed is fictionally attained at an earlier point in time than in the previously described control process, so that the final control step can also be initiated earlier, and the speed of the internal combustion engine 20 follows a curve corresponding to the one denoted by 3 in FIG. 8a. This practically involves a unilaterally effective additional D-proportion in the speed controller 63.

A realization of this "nonlinear addition to the speed controller" is shown in FIG. 8b. The actual speed signal $U_n$actual is applied to an input 80 and is transmitted via a resistor 81 to the negative input of an amplifier 82 which is part of the speed controller 63. A desired speed signal $U_n$set-point from an input 83 via a diode 84 and a capacitor 85 to the base of a transistor 86. The collector of this transistor 86 is connected directly to a positive line 87, the base is additionally connected to a voltage divider of two resistors 88 and 89 between the positive line 87 and a negative line 90, and the emitter of this transistor 86 is connected, on the one hand, via a resistor 91 to the negative line 90 and additionally, via a resistor 92, to the negative input of amplifier 82. Finally, the junction point of diode 84 and capacitor 85 is coupled via a resistor 94 to the actual speed value input 80.

In case of a reduction of the voltage at input 83, the base potential of transistor 86 is likewise reduced; the conducting of transistor 86 is reduced whereby the input potential of amplifier 82 is decreased. Thus a superposition takes place to the voltage drop via the input 80 as the actual speed value input. When the desired value jumps from a low speed to a high speed, the circuit arrangement of FIG. 8b remains ineffective on account of the diode 84.

Figure 9:
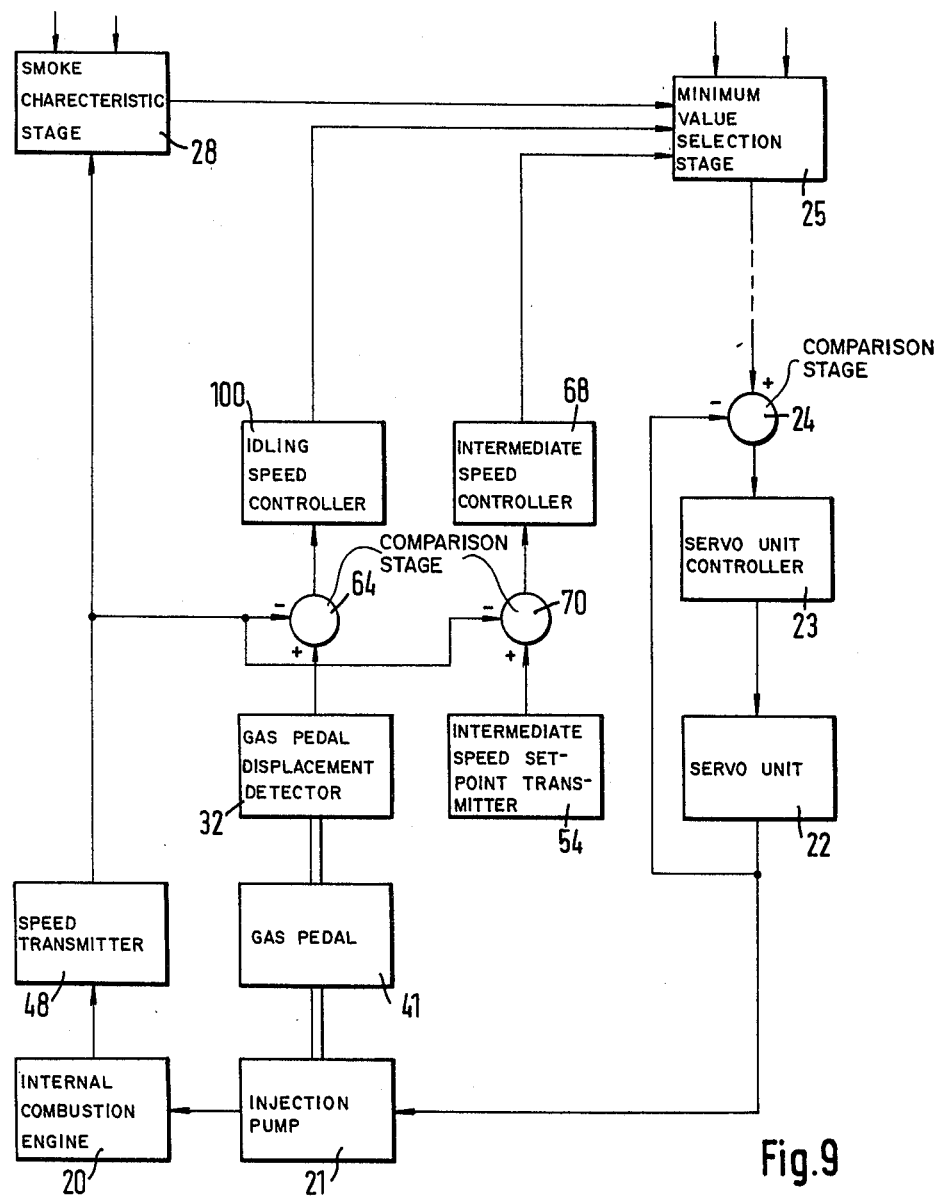
FIG. 9 is a modification of the circuit arrangement according to the block circuit diagram of FIG. 4.
Figure 10:
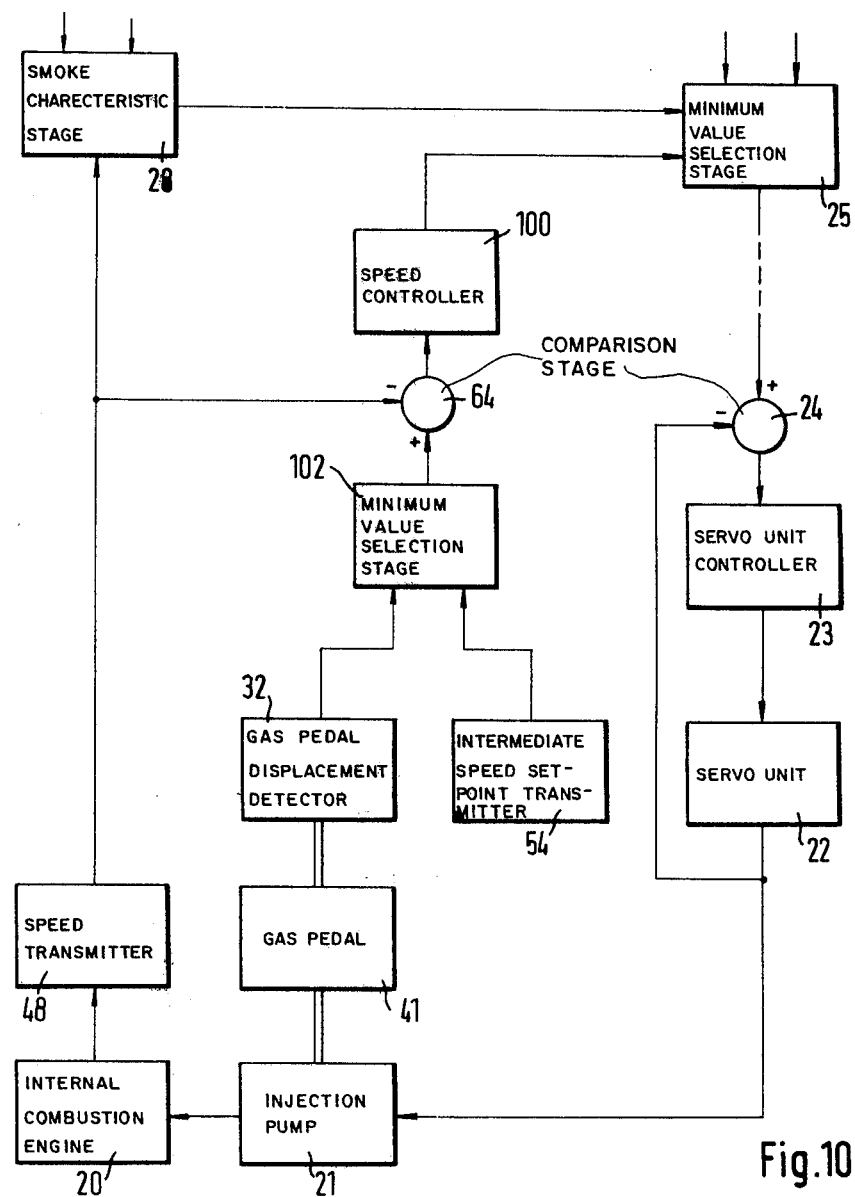
FIG. 10 is a second modification of the circuit arrangement of FIG. 4.
Figure 11:
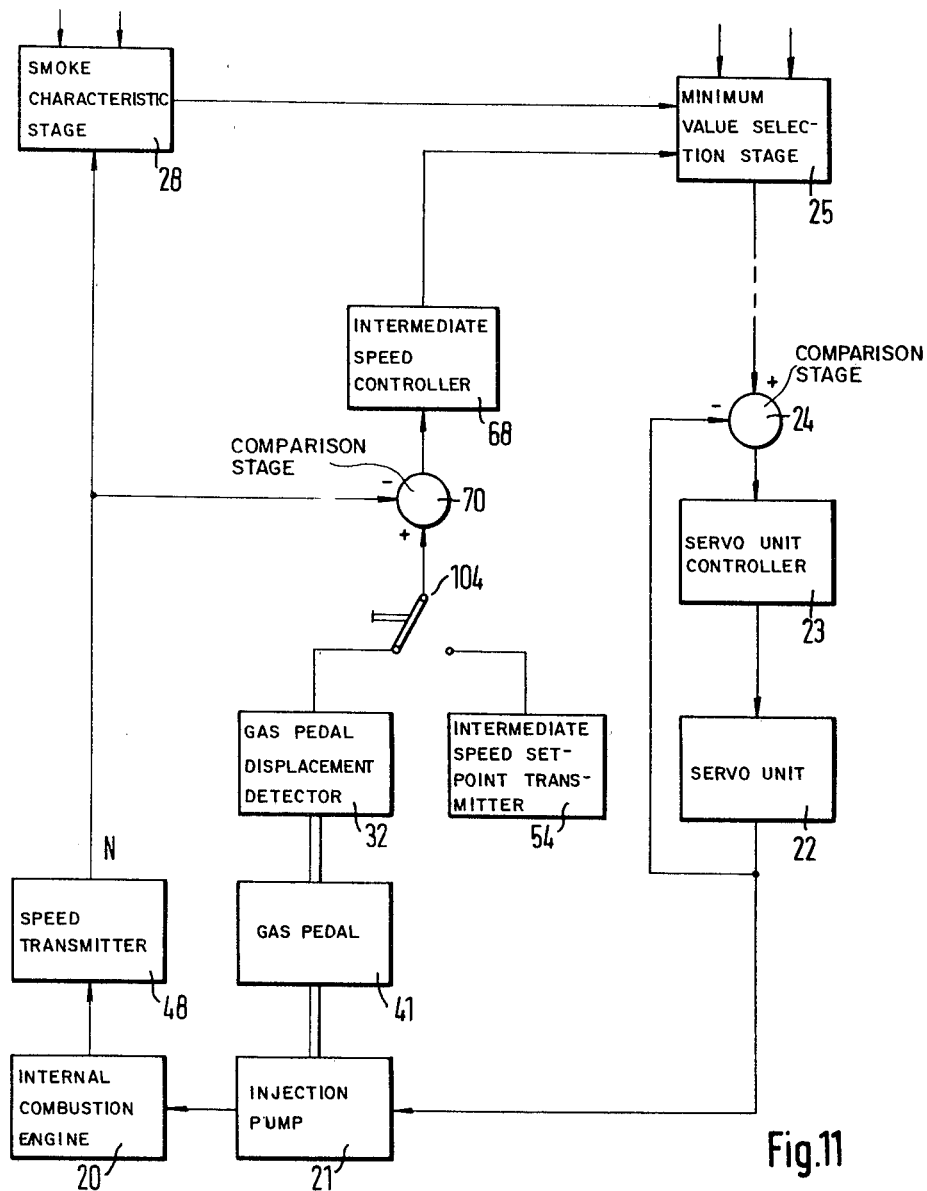
FIG. 11 is a third modification of the circuit arrangement of FIG. 4.

FIGS. 9–11 show simplified embodiments of the circuit arrangement of FIG. 4, wherein certain disadvantages with regard to driving characteristic must be tolerated. Thus, in the circuit arrangement of FIG. 9 the gas pedal displacement detector 32 is coupled directly with the comparison member 64, and the idling speed controller 100 is directly connected to the minimum value selection stage 25. Also the intermediate speed control circuit is of a simpler structure, since there is shown no addition with the driving speed regulator according to that of FIG. 4. Furthermore, also the circuit arrangement according to FIG. 9 conforms to the arrangement shown in FIG. 1.

The circuit arrangement of FIG. 10 differs from that of FIG. 9 by the omission of the intermediate speed controller 68, which, however, makes it necessary to introduce an additional minimum value selection stage 102 in front of the comparison member 64 and the speed controller 100.

A still more simplified embodiment is shown in FIG. 11. The minimum value selection stage 102 is here replaced by a double-throw switch 104 to change over from driving operation to intermediate speed control operation.

Figure 12:
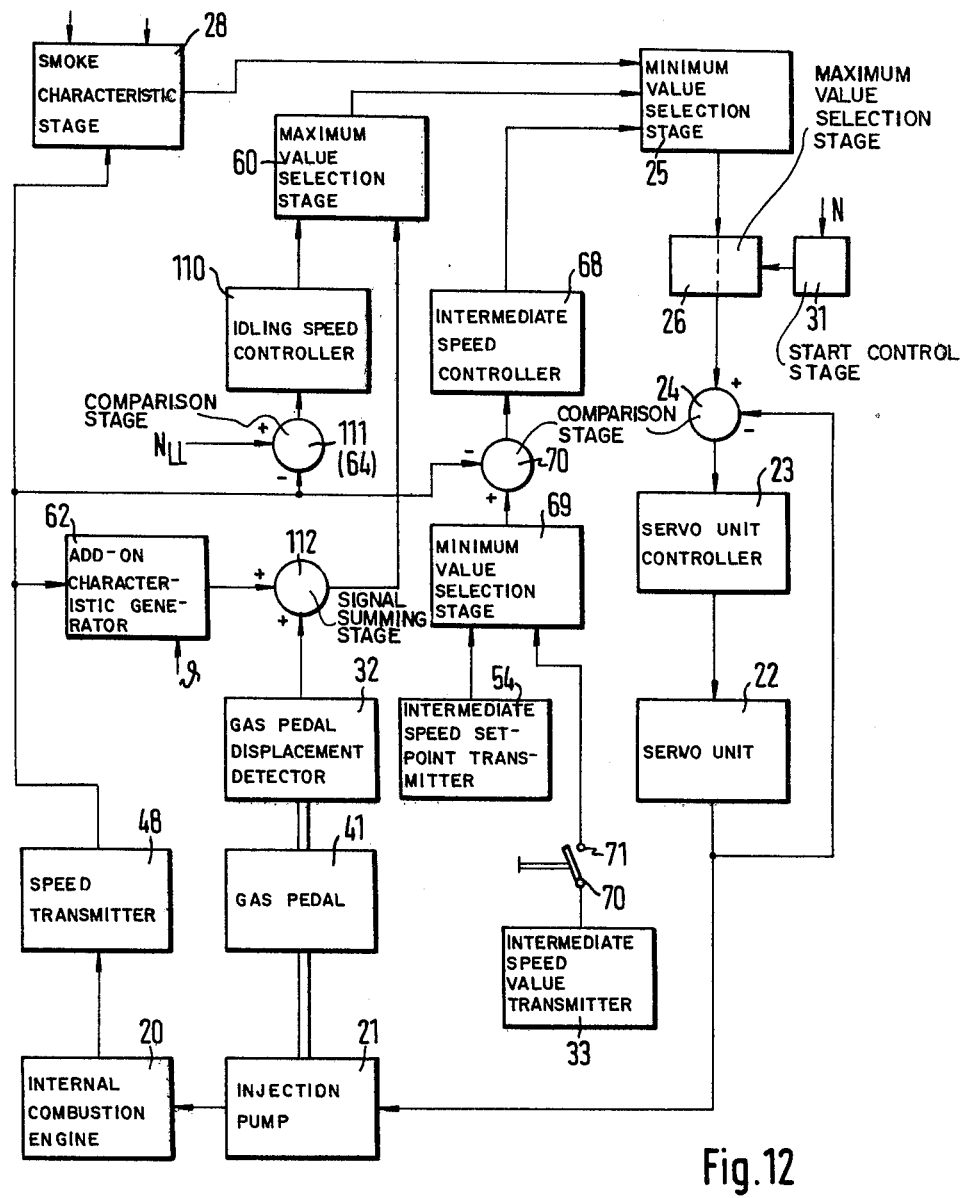
FIG. 12 is a fourth modification of the circuit arrangement of FIG. 4.

In the circuit arrangement of FIG. 12, a special situation of the arrangement of FIG. 4 is depicted, namely the situation wherein the desired speed characteristic of the function generator 65 has a course according to FIGS. 5b, curve 2 or 6b, curve 2. Since, in this instance, the desired speed characteristic is independent of the position of the gas pedal 41, it is possible to simply introduce the desired idling speed value even at the comparison point 111 (64). The function of the arrangement according to FIG. 12, which includes a speed controller 110, is explained in the description of FIGS. 4, 5 and 6.

Accordingly, the subject matter of FIG. 11 involves an electronic filling controller, wherein the idling speed is additionally regulated electronically.

What is claimed and desired to be secured by Letters Patent of the United States is:

1. Apparatus for adjusting a quantity-metering member of a fuel injection pump in an internal combustion engine, which comprises:
    servo controller means for adjusting the position of the quantity-metering member in accordance with a control signal provided to the servo controller means;
    control means for providing a plurality of control signals for adjusting the position of the quantity-metering member in accordance with selected engine operation parameters, including at least one speed control signal and at least one limit control signal corresponding to maximum metered fuel quantities which can be permitted without causing excessive torque, exhaust gas temperature, or exhaust gas contamination, the control means including speed control means for generating the at least one speed control signal and operational limit control means for generating the at least one limit control signal;
    minimum value selection means for selecting the minimum value control signal of the plurality of control signals;
    start control means for providing a start control signal for adjusting the position of the quantity-metering member during engine starting; and
    maximum value selection means for selecting the maximum value control signal of the minimum value and start control signals as the control signal provided to the servo controller means;

wherein the speed control means includes:

idling speed control means for providing an idling speed control signal for controlling engine speed during engine idling, add-on characteristic generator means for providing an add-on speed control signal for controlling engine speed during engine coasting, and second maximum value selection means, connected to receive a plurality of speed control signals, for selecting the maximum value speed control signals, for the control signals provided to the minimum value selection means, the idling speed control signal constituting a first speed control signal provided to the second maximum value selection means, and the add-on speed control signal constituting at least a portion of a second speed control signal provided to the second maximum value selecting means.

2. Apparatus according to claim 1, wherein the idling speed control means comprises:

means for generating a desired speed signal;

speed detector means for generating an actual speed signal proportional to the engine speed;

comparison means, connected to receive the desired and actual speed signals, for comparing these signals and providing an output signal; and a speed controller, connected to receive the output signal of the comparison means, for generating the idling speed control signal.

3. Apparatus according to claim 2, wherein the desired speed signal generating means comprises:

gas pedal displacement detector means, coupled to an engine gas pedal, for providing a gas pedal position signal proportional to the displacement of the gas pedal; and a function generator means connected to receive the gas pedal position signal for generating a desired speed signal as a function of the gas pedal position.

4. Apparatus according to claim 3, which further comprises:

signal summing means, connected to receive the add-on control signal and the gas pedal position signal, for summing the two signals to form the second speed control signal provided to the second maximum value selection means.

5. Apparatus according to claim 1, wherein the speed control means comprises:

intermediate speed control means for providing an intermediate speed control signal to the minimum value selection means for controlling engine speed during steady or fluctuating load conditions.

6. Apparatus for adjusting a quantity-metering member of a fuel injection pump in an internal combustion engine, which comprises:

servo controller means for adjusting the position of the quantity-metering member in accordance with a control signal provided to the servo controller means;

control means for providing a plurality of control signals for adjusting the position of the quantity-metering member in accordance with selected engine operation parameters, including at least one speed control signal and at least one limit control signal corresponding to maximum metered fuel quantities which can be permitted without causing excessive torque, exhaust gas temperature, or exhaust gas contamination, the control means including speed control means for generating the at least one speed control signal and operational limit control means for generating the at least one limit control signal;

minimum value selection means for selecting the minimum value control signal of the plurality of control signals;

start control means for providing a start control signal for adjusting the position of the quantity-metering member during engine starting; and maximum value selection means for selecting the maximum value control signal of the minimum value and start control signals as the control signal provided to the servo controller means;

wherein the speed control means includes:

gas pedal displacement detector means, coupled to an engine gas pedal, for providing a gas pedal position signal proportional to the displacement of the gas pedal, a function generator means, connected to receive the gas pedal position signal, for generating a desired speed signal as a function of the gas pedal position, speed detector means for generating an actual speed signal proportional to the engine speed, and signal processing means, connected to receive the desired and actual speed signals, for comparing these signals and generating an idling speed control signal, the signal processing means including a unilateral effective additional D-proportional circuit means for dynamically superimposing an apparent speed signal on the actual speed signal when the desired speed signal suddenly decreases due to sudden movement of the gas pedal, to thus provide a fictional speed signal indicating a lower speed that the actual speed for comparison with the desired speed signal.

7. Apparatus according to claim 6, wherein the speed control means further comprises:

second maximum value selection means, connected to receive the idling speed control signal and the gas pedal position signal, for selecting a maximum value signal of the two received signals as one of the control signals provided to the minimum value selection means.

8. Apparatus according to claim 6, wherein the speed control means comprises:

intermediate speed control means for providing an intermediate speed control signal to the minimum value selection means for controlling engine speed during steady or fluctuating load conditions.

9. Apparatus for adjusting a quantity-metering member of a fuel injection pump in an internal combustion engine, which comprises:

servo controller means for adjusting the position of the quantity-metering member in accordance with a control signal provided to the servo controller means;

control means for providing a plurality of control signals for adjusting the position of the quantity-metering member in accordance with selected engine operation parameters, including at least one speed control signal and at least one limit control signal corresponding to maximum metered fuel quantities which can be permitted without causing excessive torque, exhaust gas temperature, or exhaust gas contamination, the control means including speed control means for generating the at least one speed control signal and operational limit control means for generating the at least one limit control signal;

minimum value selection means for selecting the minimum value control signal of the plurality of control signals;

start control means for providing a start control signal for adjusting the position of the quantity-metering member during engine starting; and maximum value selection means for selecting the maximum value control signal of the minimum value and start control signals as the control signal provided to the servo controller means;

wherein the speed control means includes:

idling speed control means for providing an idling speed control signal to the minimum value selection means for controlling engine speed during engine idling, and intermediate speed control means for providing an intermediate speed control signal to the minimum value selection means for controlling engine speed during steady or fluctuating load conditions.

10. Apparatus according to claims 1, 6, or 9, wherein the at least one limit control signal provided to the minimum value selection means includes a smoke limit control signal, a torque limit control signal, and an exhaust gas temperature limit control signal, and wherein the control means comprises:

smoke control means for generating the smoke limit control signal as a function of speed, fuel temperature, and induced air mass;

torque control means for generating the torque limit control signal as a function of speed and fuel temperature; and exhaust temperature control means for generating the exhaust gas temperature limit control signal as a function of speed and exhaust gas temperature.

11. Apparatus according to claims 1, 6, or 9, wherein the speed control means further comprises:

final control means for providing a final speed control signal to the minimum value selection means to regulate the engine speed when it is higher than a predetermined value.

12. Apparatus according to claims 1, 6, or 9, wherein the fuel injection pump includes a mechanical control means for adjusting the quantity-metering member, and the servo controller means includes a movable abutment which is positioned in accordance with the control signal provided to the servo controller means to limit the displacement of the quantity-metering member, and wherein the mechanical control means cooperates with the apparatus so that when the engine is operating in a low speed range, the position of the quantity-metering member is adjusted solely by the apparatus.

13. Apparatus according to claims 5, 8, or 9, wherein the speed control means further comprises:

driving speed regulating means for providing a driving speed control signal to limit engine driving speed;

switch means for providing the driving speed control signal to the intermediate speed control means when the engine is connected for driving operation, whereby the intermediate speed control means also serves as a driving speed limiter.

* * * * *